United States Patent [19]

Gastaldi et al.

[11] Patent Number: 4,579,482
[45] Date of Patent: Apr. 1, 1986

[54] POWDER DISTRIBUTOR, PARTICULARLY FOR A HOT SPRAY GUN

[75] Inventors: Sébastien Gastaldi, Pierrelatte; Henri Martin, Orange; Philippe Boufflet, Saint-Paul-Trois-Châteaux, all of France

[73] Assignee: Societe de Fabrication d'Elements Catalytiques, Bollene, France

[21] Appl. No.: 591,823

[22] Filed: Mar. 21, 1984

[30] Foreign Application Priority Data

Mar. 28, 1983 [FR] France .................. 83 05061

[51] Int. Cl.$^4$ ............................................. B65G 53/66
[52] U.S. Cl. ........................................ 406/32; 406/10; 406/53; 406/75; 406/93
[58] Field of Search .................. 406/10, 32, 53, 75, 406/93, 94, 153, 194

[56] References Cited

U.S. PATENT DOCUMENTS

| 2,738,234 | 3/1956 | Anderson | 406/75 |
| 2,841,101 | 7/1958 | Hale et al. | 406/10 |
| 3,065,032 | 11/1962 | Sylvester . | |
| 3,149,759 | 9/1964 | Manley | 406/75 |

FOREIGN PATENT DOCUMENTS 1045562 11/1953 France .
2159182 6/1973 France .

OTHER PUBLICATIONS

BE-A-545.194 Figures.
IBM Technical Disclosure Bulletin, vol. 12, No. 8, Jan. 1970, New York (US) H, H. Manner et al: "Grit Feeder", p. 1153.

Primary Examiner—Jeffrey V. Nase
Attorney, Agent, or Firm—Pearne, Gordon, Sessions, McCoy, Granger & Tulberry

[57] ABSTRACT

The invention relates to a powder distributor for dosing and conveying a powder up to a use apparatus. The distributor comprises a pressurized storage tank, a dosing vibrating bowl and an Archimedean screw or a valve for transferring the powder from the tank to the bowl. The putting into operation of the screw is controlled as a function of the powder level in the bowl. The vibrating bowl is placed in a tight enclosure into which is injected a carrier gas used for conveying the powder in a pipe up to the use apparatus. An accelerometer carried by the vibrating bowl makes it possible to check the weight of the powder supplied by the latter. Application more particularly to hot spray guns, such as chemical flame torches and quenches arc plasma torch guns, in a free or controlled atmosphere.

14 Claims, 4 Drawing Figures

POWDER DISTRIBUTOR, PARTICULARLY FOR A HOT SPRAY GUN

BACKGROUND OF THE INVENTION

The present invention relates to a powder distributor for very accurately dosing a powder followed by the conveying thereof to a random use apparatus, such as a hot spray gun.

The hot spray guns to which the invention can be advantageously applied are in particular chemical flame torches and quenched arc plasma torch guns, in a free or a controlled atmosphere. However, the invention is not limited to these applications and can be used in all cases where it is necessary to dose and convey a bulk powder very accurately towards a random apparatus. In general terms, the powder distributors must fulfil the two essential functions of dosing the powder and conveying it up to the use apparatus.

In order to dose the powder, as far as possible account must be taken on the one hand of the need of being able to supply the powder use apparatus with powders having very different characteristics and on the other hand of the need of having a powder distributor ensuring that the use apparatus can be supplied with powder in a time-reproducible manner. Among the powder characteristics which must be modifiable, reference is particularly made to the nature of the powder (metallic, organic, ceramic, ceramel, oxide, etc.), its density (varying e.g. from 1 to 7), its grain size (varying e.g. between 2 and 200 microns), and the shape of the grains.

In the present state of the art, no powder distributor makes it possible to dose powder whilst completely satisfying these two requirements.

Thus, there are powder distributors, like that described in French Patent No. 2,048,781, in which the dosing of the powder is carried out by entirely fluidic means. Although such devices can be generally used for powders having very variable characteristics, they are not satisfactory from the standpoint of the time reproducibility of the results obtained.

Conversely, German Patent No. 2,807,866 describes powder distributors using entirely mechanical dosing means. However, these distributors adapt only poorly to the changes in the characteristics of the powder generally required by the user. Moreover, the presently existing dosing mechanisms do not make it possible to prevent the formation of powder accumulations and consequently the formation of arches stopping the advance of the product. Moreover, they do not make it possible to regulate the dosing of the powder as satisfactorily as is desirable and do not prevent possible grain size segregation. Moreover, existing powder distributors almost all use carrier gas for conveying the powder up to the use apparatus.

SUMMARY OF THE INVENTION

The present invention relates to a powder distributor making it possible to take advantage of the positive points of mechanical dosing equipment and the positive points of fluidic dosing equipment, whilst eliminating their negative points.

The present invention therefore specifically proposes a powder distributor incorporating at least one storage tank, means for dosing the powder contained in the tank and means for conveying the dosed powder to be distributed by a carrier gas, wherein the dosing means incorporate a vibrating bowl located in a tight enclosure and having an outlet linked with a conveying pipe, the conveying means incorporating means for introducing a pressurized carrier gas into the tank and tight enclosure, together with an equipressure accelerator located in the conveying pipe and having a convergent area followed by a divergent area, said two areas being separated by an annular passage linked with the interior of the tight enclosure and whose cross-section decreases radially towards the inside, whilst the distributor comprises means for the mechanical transfer of the powder from the tank to the vibrating bowl, controlled by signals supplied by at least one sensor for sensing the powder level in the vibrating bowl.

According to a first constructional variant of the invention, the storage tank has at its lower end a conical hopper positioned above the vibrating bowl, the means for the mechanical transfer of the powder incorporating an Archimedean screw disposed along a generatrix of the conical hopper in the bottom thereof and in a passage issuing above the vibrating bowl.

According to a second constructional variant of the invention, the storage tank has at its lower end a conical hopper located above the vibrating bowl, the means for the mechanical transfer of the powder incorporating a valve located in a passage linked with the bottom of the hopper and issuing above the vibrating bowl, as well as a mobile member located in the bottom of the hopper along a generatrix thereof.

Preferably, the equipressure accelerator comprises at least two members, between which is formed the annular passage and each of which carries one of the said convergent and divergent areas, as well as means for displacing these members relative to one another along the axis of the pipe, in order to regulate the width of the annular passage.

According to another feature of the invention, the vibrating bowl comprises a base, whose depth increases from the centre towards the periphery and a spiral groove linking the bottom of the bowl with the outlet, in such a way that its lower end is located at the level of the periphery of the base of the bowl and regularly rises up to the outlet.

Preferably, the vibrating bowl is actuated by a vibration generator positioned below the bowl and resting on the bottom of the tight enclosure, means being provided for regulating the operating conditions of said generator. In order to control the powder dosing realised by the vibrating bowl, the latter then carries an accelerometer supplying signals representing the weight of the powder supplied by the vibrating bowl, said signal acting on the means for regulating the operating conditions of the vibration generator.

According to another feature of the invention, a bellows which is permeable to the gases and impermeable to the powders connects the periphery of the vibrating bowl to the walls of the tight enclosure, in order to prevent the powders from accidentally reaching the vibration generator.

According to a special embodiment of the invention, the distributor comprises two capacitive level sensors defining the minimum and maximum levels of the powders in the vibrating bowl and switching means controlling the putting into operation of the mechanical transfer means, when the powder level in the vibrating bowl is between said minimum and maximum levels, and their stoppage in the opposite case. Preferably, the minimum and maximum levels defined by the sensors are then regulatable.

According to yet another feature of the invention, the means for introducing a carrier gas into the tank and into the tight enclosure incorporate means for introducing the carrier gas into the tight enclosure and at least one tube connecting the latter to the upper end of the storage tank. Moreover, these means preferably make it possible to introduce the gas at a constant regulatable flow rate.

In certain applications, means for heating the powder can be provided in the storage tank.

Finally, means for measuring the pressure prevailing in the tight enclosure can be provided, particularly in order to detect the possible obstruction of the equipressure accelerator.

BRIEF DESCRIPTION OF THE DRAWINGS

The invention will be described in greater detail hereinafter relative to non-limitative embodiments and with reference to the attached drawings, wherein show.

DETAILED DESCRIPTION OF THE INVENTION

Figure 1:
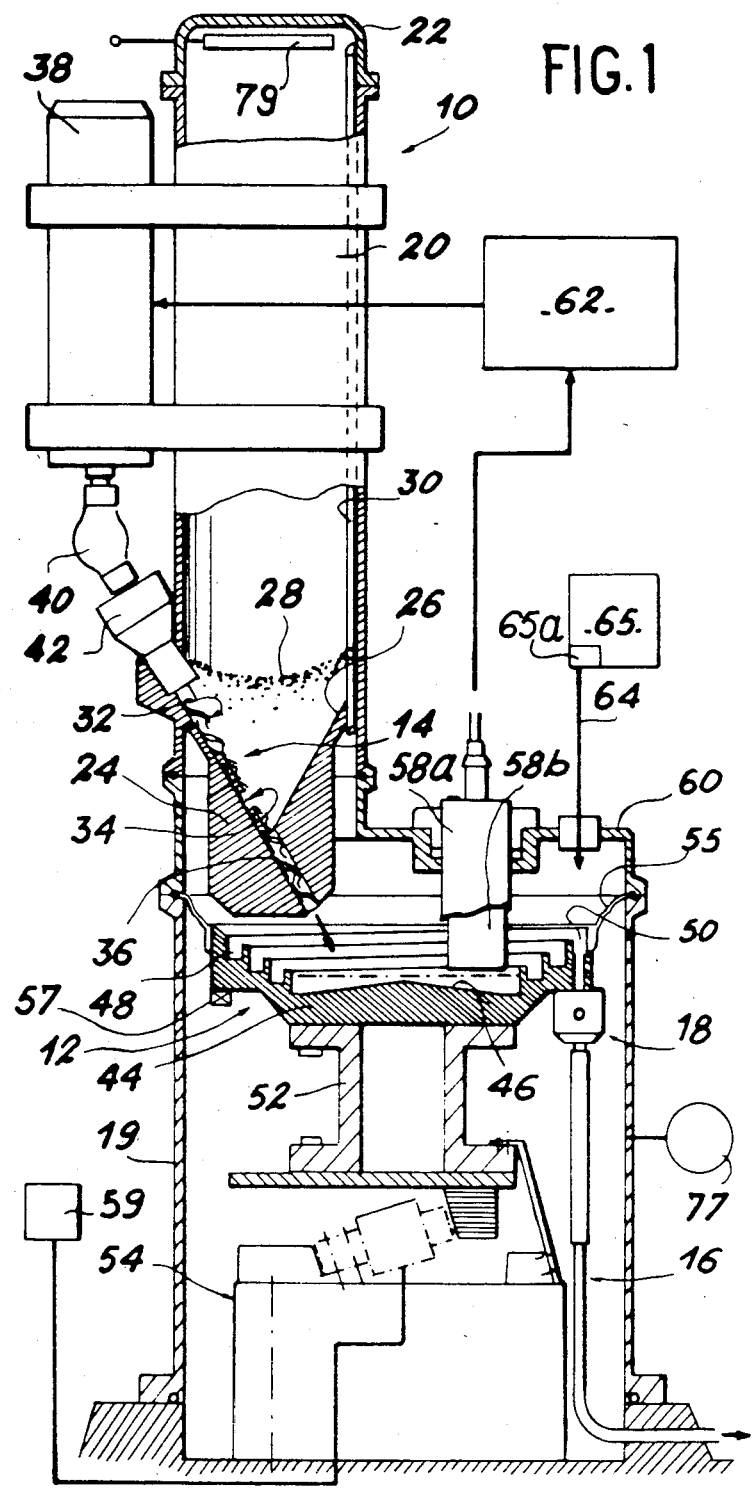
FIG. 1 a diagrammatic cross-sectional view of the powder distributor according to the invention.

As illustrated in FIG. 1, the powder distributor according to the invention essentially comprises a tight storage tank 10, a vibrating bowl 12 ensuring the dosing of the powder, means 14 for mechanically transferring the powder from tank 10 to vibrating bowl 12 and a conveying pipe 16, whose inlet is provided with an equipressure accelerator 18. Pipe 16 conveys the powder from vibrating bowl 12 to the not shown use apparatus under the effect of the pressurization of a tight enclosure 19 containing vibrating bowl 12 and part of pipe 16.

More specifically, storage tank 10 comprises a vertically axed cylindrical ferrule 20 tightly closed at its upper end by a removable cover 22. Ferrule 20 is extended at its lower end for forming the bottom 24 of the tank, whose inner wall 26 defines a conical hopper facilitating the outflow of the powder 28 contained in the tank. For example, the capacity of tank 10 can vary between 1.5 and 3 liters, as a function of requirements.

The powder 28 contained in the tank is pressurized by the carrier gas, which is also used for conveying the powder up to the use apparatus by pipe 16. This pressurization of tank 10 facilitates the transfer of powder into vibrating bowl 12. It is carried out by means of at least one vertical tube 30 connecting the internal volume of the tight enclosure 19, into which is injected the carrier gas, to the upper end of tank 10. As illustrated in FIG. 1, tube 30 is preferably located within ferrule 20.

Figure 1A:
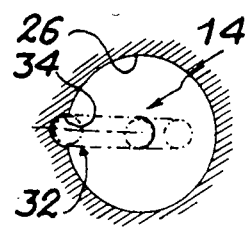
FIG. 1a is a schematic sectional view of the conical hopper of the distributor shown in FIG. 1, illustrating a groove in which an Archimedean screw is received.

In the embodiment of FIG. 1, the means 14 for transferring powder 28 from tank 10 to vibrating bowl 12 incorporate an Archimedean screw 32 traversing the bottom 24 of the tank along a generatrix of the conical hopper 26. More specifically, part of the screw 32 is located in a semicircular groove 34 extending along a generatrix of hopper 26, as is also shown in FIG. 1a. The end of screw 32 is located in a passage 36, having a circular cross-section, whilst extending groove 34 and issuing above the central part of vibrating bowl 12.

The rotation of Archimedean screw 32 is controlled by a geared motor 38 fixed to ferrule 20 of the tank, by means of a bevel gear 40 and a sealing device 42 positioned level with the passage through ferrule 20.

The main function of screw 32 is to control the transfer of powder 28 from tank 10 to vibrating bowl 12. In other words, screw 32 controls the powder supply of the vibrating bowl and consequently aids the latter to satisfactorily fulfil the powder dosing function.

The Archimedean screw 32 also prevents the formation of powder accumulations in the bottom of the storage tank. For this purpose, FIG. 1 shows that part of the screw is placed outside groove 34, so that no arches preventing the advance of the powder can be formed.

As has been shown, the passage 36 by which screw 32 transfers the powder into vibrating bowl 12 issues above the central part thereof. More specifically, passage 36 issues above the bottom 44 of the vibrating bowl. In order to bring the powder towards the periphery of the bowl, bottom 44 has a depth increasing from the centre towards the periphery, so that it defines a conical surface 46. In addition, vibrating bowl 12 has a spiral slot 48 linking the periphery of the bottom 44 to an outlet 50, whilst rising in a regular manner.

Vibrating bowl 12 is supported by a spacer 52, which rests on a random known type of vibrating generator 54. Preferably, vibration generator 54 is directly fixed to the bottom of tight enclosure 19.

As stated hereinbefore, the essential function of vibrating bowl 12 is to ensure the dosing of the powder. In other words, the vibrating bowl continuously supplies to outlet 50 a quantity of powder, which is perfectly dosed in accordance with the requirements of the use apparatus connected to pipe 16. The equipressure accelerator 18 then ensures within said pipe a motive function of displacing the dosed powder.

According to a particularly interesting improvement of the device according to the invention, the dosing of the powder effected by the vibrating bowl 12 is regulated by means of an accelerometer 57, which is fixed to the said bowl. Preferably, the accelerometer 57 is fixed to the bowl periphery, e.g. below bottom 44, as illustrated in FIG. 1.

At all times, accelerometer 57 supplies a signal representing the energy applied to the powder by the bowl. For a given powder, the energy dissipated at the bowl corresponds to a clearly defined weight of powder supplied by the bowl. The signal supplied by the accelerometer consequently represents the weight of the powder supplied and therefore the flow rate.

Thus, it is possible to precisely regulate the weight of powder supplied by the bowl, independently of the environmental conditions and the possibly unstable nature of the supply voltage for the vibration generator 54.

This regulation can take place manually, The information supplied by the accelerometer is then used for acting on the power supply 59 for generator 54, when the flow rate moves too far away from the desired value.

The regulation can also be carried out automatically using a control system sensitive to the signal supplied by the accelerometer for modifying the supply voltage of the vibration generator 54, in order to regulate the powder flow rate. Known control means can be used for this purpose.

To prevent the powder from reaching vibration generator 54, which might damage it, between the periphery of vibrating bowl 12 and the walls of enclosure 19 are provided a bellows 55 which is impermeable to the powder. Preferably, this bellows is permeable to the gases, in order to permit an introduction of the carrier gas through the base of enclosure 19, as will be shown hereinafter.

According to an important feature of the invention, the putting into operation of the geared motor 38 operating the Archimedean screw 32 is controlled as a function of the powder level present in the bottom of vibrating bowl 12.

In the represented embodiment, this control is of the "all or nothing" type. Therefore, use is made of two level sensors 58a, 58b, tightly mounted on cover 60 of enclosure 19, in order to respectively detect a minimum level and a maximum level of powder in the bottom of the vibrating bowl.

Preferably, sensors 58a, 58b make it possible to regulate the value of the detected minimum and maximum levels. Thus, they are fixed to the cover 60 in such a way as to e.g. permit the regulation of the vertical positioning thereof.

In order to be able to detect the powder level in the bottom of the bowl, no matter what the nature of the powder, sensors 58a, 58b are preferably capacitive sensors. However, it will be apparent that level sensors of any known type can also be used.

The "all or nothing" electric signal supplied by sensors 58a, 58b are transmitted to a switching device 62 for energizing or stopping the geared motor 38, depending on whether the powder level in the bottom of the vibrating bowl is between the minimum and maximum values determined by the sensors or, conversely, is outside this range.

In a not shown constructional variant the geared motor 38 can be of the variable speed type and can be dependent on the level of the powder in the bottom of the vibrating bowl. A single level sensor giving a quantitative indication of the level can then be used for checking a feedback circuit controlling the operation of the geared motor.

As has been shown hereinbefore, the conveying of the powder from the vibrating bowl 12, which ensures its dosing, to the not shown use apparatus, takes place by pipe 16 extending to outlet 50. Moreover, the outflow of two-phase fluid constituting the powder mixed with the carrier gas is brought about by the pressure difference between the internal volume of the enclosure 19 and the point of injecting the powder into the use apparatus. This pressure difference results from the pressurization of the volume within the tight enclosure 19.

The pressurization of enclosure 19 is obtained by an injection at a constant flow rate of the carrier gas into the said enclosure. In the variant shown in FIG. 1, said injection is performed by a pipe 64 passing through cover 60 and disposed essentially in the extension of outlet 50. However, this arrangement is not limitative and in particular pipe 64 could be placed in the base of enclosure 19, in order to concentrate all the control and checking members of the device at said level. Preferably, the carrier gas injection means 65, which are of a known type, including means 65a to measure the flow rate and regulate it as a function of the desired application.

Figure 2:
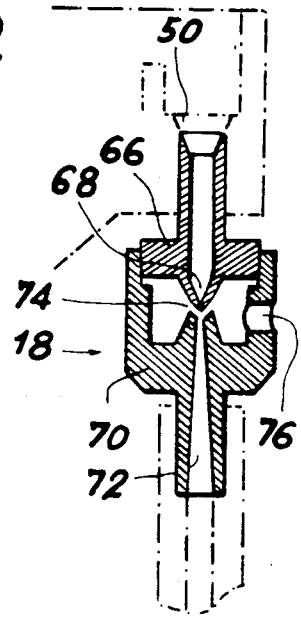
FIG. 2 a larger scale sectional view of an equipressure accelerator used in the distributor of FIG. 1.

In the embodiment shown in FIG. 1, the inlet of pipe 16 is provided wtih an equipressure accelerator 18, shown in greater detail in FIG. 2. This accelerator has the function of homogenizing the mixture formed by the carrier gas and by the powder and to move the latter towards the use apparatus.

As shown in FIG. 2, accelerator 18 comprises a first part 66 constituting an injector extending vertically downwards the outlet 50 of the vibrating bowl. The lower end of injector 66 has a convergent area 68 issuing in front of a divergent area 72 formed on a second part 70, into which is screwed injector 66.

The acceleration of the mixture in accelerator 18 is brought about by an annular passage 74 formed between the ends of parts 66 and 70 and communicating with the inner volume of the pressurized enclosure 19 by at least one passage 76 formed in part 70. Preferably, the cross-section of annular passage 74 decreases from the outside to the inside and said passage is generally oriented downwards, i.e. in the two-phase fluid outflow direction. FIG. 2 also shows that the angle of the convergent area 68 is significantly larger than the angle of the divergent area 72.

It is clear that the greater or lesser screwing of injector 66 into part 70 makes it possible to regulate the width of annular passage 74, in accordance with the characteristics of the powder. A powder flow rate between 100 and 20,000 g/h can thus be obtained, as a function of the desired speed and as a function of the density of the powder.

As illustrated in FIG. 1, the pressure prevailing in enclosure 19 can be monitored, e.g. with the aid of a pressure gauge 77. In accordance with another aspect of the device according to the invention, this monitoring makes it possible to detect any obstruction of accelerator 18 by a foreign body or any powder saturation of said accelerator.

Thus, the pressure prevailing in enclosure 19 increases with the distributed powder flow rate. This is explained by the fact that the pressure drop at the equipressure accelerator 18 increases with the flow rate. If there is an obstruction to the accelerator, the powder flow rate becomes very low or zero. This leads to a significant drop in the pressure in the enclosure, which is detected by pressure gauge 77.

Figure 3:
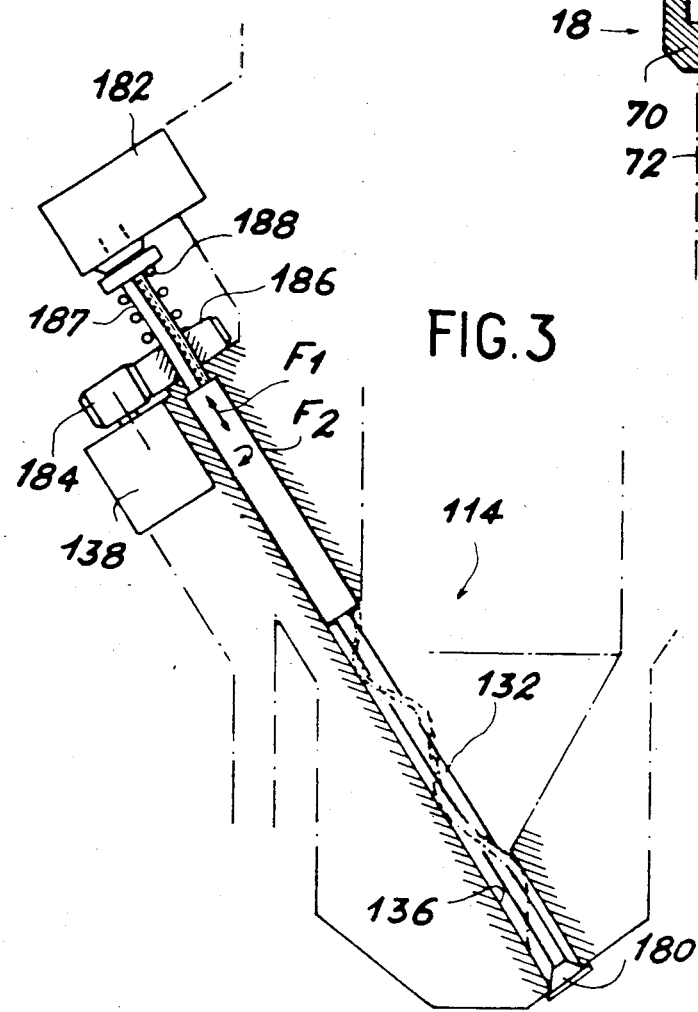
FIG. 3 a larger scale sectional view of a constructional variant of the means for transferring the powder from storage tank to the vibrating bowl, in the powder distributor shown in FIG. 1.

FIG. 3 shows a constructional variant of the transfer means 114 used for transferring the powder from the storage tank to the vibrating bowl used for the dosing thereof. This embodiment is particularly suitable in the case where the powders contained in the tank are particularly fluid. Thus, in this case, it is clear that an outflow of powder towards the vibrating bowl could occur even after the Archimedean screw has stopped.

As shown in FIG. 3, the Archimedean screw 132 is then provided at its lower end with a valve 180, which normally closes the lower end of passage 136 traversing the bottom of the storage tank. In order to permit the opening and closing of the passage, it is therefore necessary to make screw 132 move along its axis. This is brought about by means of a motor 182 having the effect of downwardly displacing the Archimedean screw 132 (arrow $F_1$ in FIG. 3), thus removing valve 180 from passage 136.

The rotation of the Archimedean screw in accordance with arrow $F_2$ is controlled by a motor 138 using pinions 184, 186. Pinion 186 is keyed on a rod 187 which extends the Archimedean screw and is kept in a fixed position despite displacements thereof along the direction of arrow $F_1$, under the effect of a spring 188.

In the variant of FIG. 3, motors 138 and 182 are simultaneously controlled from the level sensor or sensors for the powder in the vibrating bowl.

In another not shown variant similar to that of FIG. 3, Archimedean screw 132 could be eliminated and replaced by scrapers such as pins, mounted on a rod performing a reciprocating movement, making it possible both to check by means of the valve the transfer of powder into the vibrating bowl and to prevent by the scrapers the formation of arches in the storage tank.

As a result of the device described hereinbefore relative to FIGS. 1 to 3, it is possible by a minimum of settings to adapt the distributor to the characteristics of the powder and to the characteristics of the use apparatus. In particular, the flow rate of the distributor can be regulated at random by acting on the power supply 59 of vibration generator 54. In parallel, it is possible by regulating the flow rate of the carrier gas admitted into the enclosure to check at random the transfer of powder towards the use apparatus. By acting on the level sensor or sensors in vibrating bowl 12, it is also possible to regulate the transfer of powder into the latter. Finally, it has been shown that it is also possible to regulate accelerator 18.

Obviously, the powder distributor described hereinbefore can undergo a certain number of modifications and improvements without passing beyond the scope of the invention. In particular, storage tank 10 can be provided, for certain applications, with known preheating means, such as electrical heating means 79 located within ferrule 20 and/or in cover 22. It is also possible to equip the same powder distributor with several storage tanks containing powders of different types, in order to effect both the mixing and the dosing in the vibrating bowl.

What is claimed is:

1. A powder distributor comprising:
   at least one storage tank capable of containing powder;
   means for dosing the powder comprising a vibrating bowl located in a tight enclosure, the vibrating bowl having means defining an outlet linked with a conveying pipe;
   means for mechanical transfer of powder from the storage tank to the vibrating bowl, the means being controlled by signals supplied by at least one sensor for sensing the powder level in the vibrating bowl; and
   means for conveying the dosed powder to be distributed by a carrier gas comprising means for introducing a pressurized carrier gas into the storage tank and the tight enclosure, and an equipressure accelerator, the equipressure accelerator connected with the conveying pipe and including means defining a convergent area, a divergent area, and an annular passage, and the convergent area and the divergent area having a common axis and being separated by the annular passage, the annular passage having a cross section which decreases radially towards the common axis and further defining means which communicate with the interior of the tight enclosure.

2. A powder distributor according to claim 1, wherein the storage tank has at its lower end a conical hopper positioned above the vibrating bowl, the means for the mechanical transfer of the powder incorporating an Archimedean screw disposed along a generatrix of the conical hopper in the bottom thereof and in a passage issuing above the vibrating bowl.

3. A powder distributor according to claim 1, wherein the storage tank has at its lower end a conical hopper located above the vibrating bowl, the means for the mechanical transfer of the powder incorporating a valve located in a passage linked with the bottom of the hopper and issuing above the vibrating bowl, as well as a mobile member located in the bottom of the hopper along a generatrix thereof.

4. A powder distributor according to any one of the claims 1 to 3, wherein the equipressure accelerator comprises at least two members, between which is formed the annular passage and each of which carries one of the said convergent and divergent areas, as well as means for displacing these members relative to one another along the axis of the pipe, in order to regulate the width of the annular passage.

5. A powder distributor according to claim 1, wherein the vibrating bowl comprises a base, whose depth increases from the centre towards the periphery and a spiral groove linking the bottom of the bowl with the outlet, in such a way that its lower end is located at the level of the periphery of the base of the bowl and regularly rises up to the outlet.

6. A powder distributor according to claim 1, and comprising in addition bellows and wherein a vibration generator is positioned below the bellows and rests on the bottom of the tight enclosure; and means being provided for regulating the operating conditions of said generator.

7. A powder distributor according to claim 6, wherein the vibrating bowl carries an accelerometer supplying signals representing the weight of the powder supplied by the bowl, said signals acting on the means for regulating the operating conditions of the vibration generator.

8. A powder distributor according to claim 1, wherein a bellows, which is permeable to gases and impermeable to powders, connects the periphery of the vibrating bowl to the walls of the tight enclosure.

9. A powder distributor according to claim 1, wherein it comprises two capacitive level sensors defining the minimum and maximum powder levels in the vibrating bowl, as well as switching means controlling the putting into operation of the mechanical transfer means, when the powder level in the vibrating bowl is between said minimum and maximum values, as well as the stopping thereof in the opposite case.

10. A powder distributor according to claim 9, wherein the minimum and maximum levels defined by the sensors are regulatable.

11. A powder distributor according to claim 1, wherein the means for introducing a carrier gas into the tank and into the tight enclosure incorporate means for introducing the carrier gas into the tight enclosure and at least one tube connecting the latter to the upper end of the storage tank.

12. A powder distributor according to claim 1, wherein the means for introducing a carrier gas into the tank and into the tight enclosure make it possible to introduce the gas at a regulatable constant flow rate.

13. A powder distributor acoording to claim 1, wherein it also comprises means for preheating the powder in the storage tank.

14. A powder distributor according to claim 1, wherein it also comprises means for measuring the pressure prevailing in the tight enclosure.

* * * * *